Patented June 16, 1931

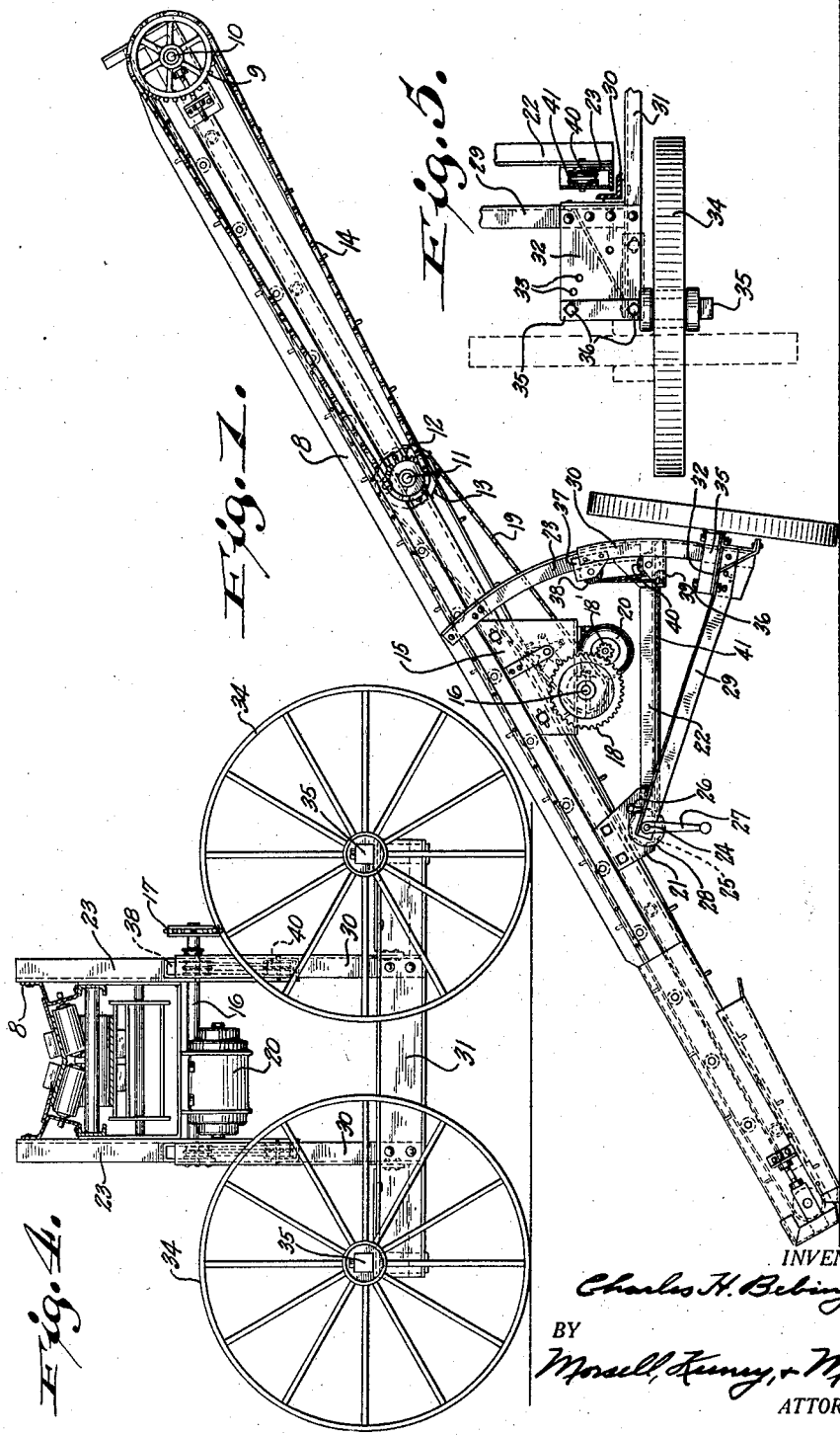

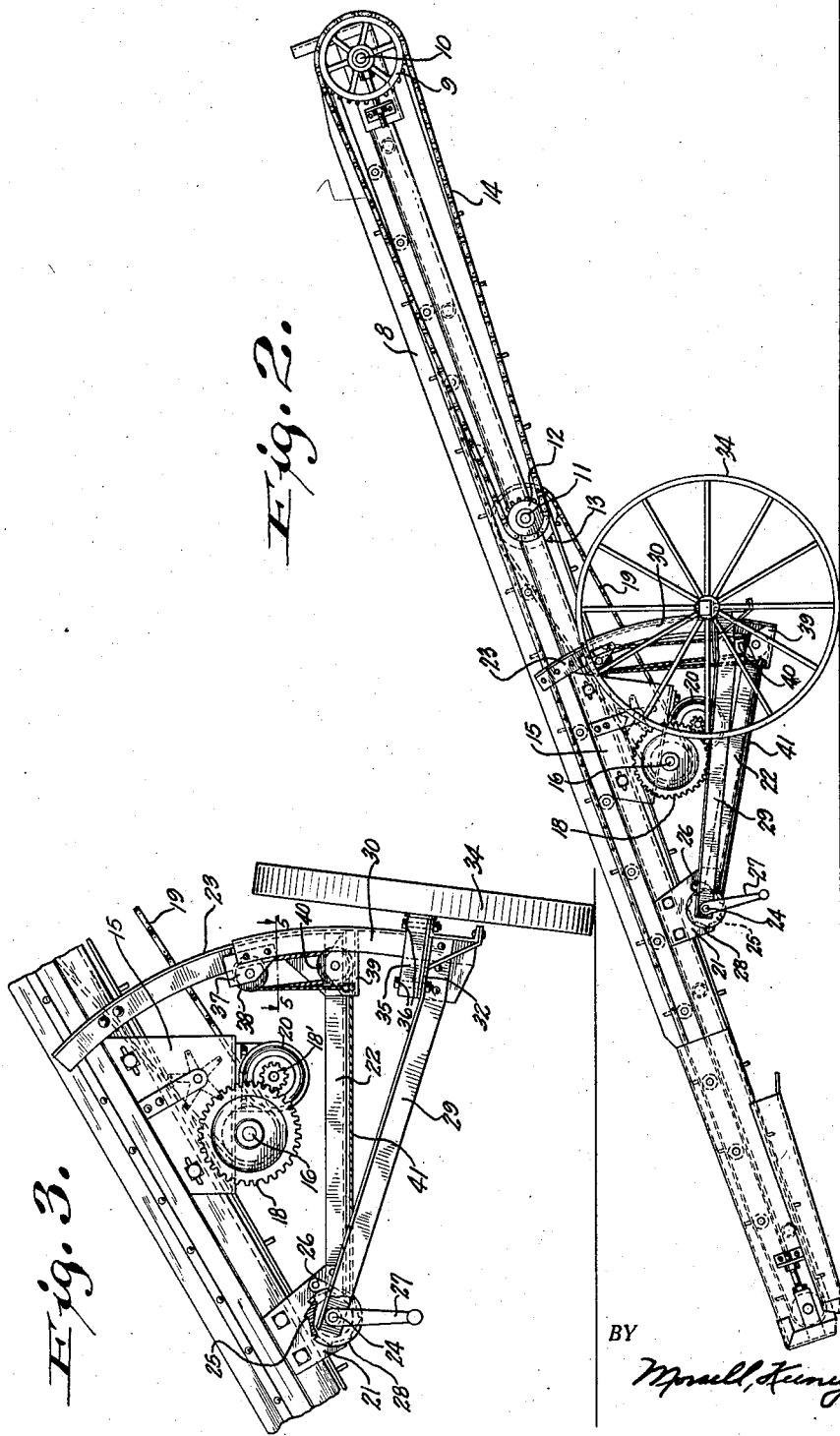

1,810,119

UNITED STATES PATENT OFFICE

CHARLES H. BEBINGER, OF JANESVILLE, WISCONSIN, ASSIGNOR TO NORTHERN CONVEYOR & MFG. CO., OF JANESVILLE, WISCONSIN, A CORPORATION OF WISCONSIN

MATERIAL HANDLING MACHINE

Application filed February 28, 1929. Serial No. 343,355.

This invention relates to improvements in material handling machines.

It is one of the objects of this invention to provide an improved material handling machine in which the conveyer portion is mounted on a novel form of underslung truck, the said truck being provided with novel means for varying the elevation of the conveyer portion.

A more specific object of this invention is to provide a material handling machine in which the supporting truck is formed of radially extending side members which are pivoted at one end to the conveyer and which have arcuate portions extending upwardly from their other ends, the said portions slidably engaging arcuate members extending from the conveyer to effect variations in the elevation of the conveyer.

It is a further object of this invention to provide a material handling machine having means for varying the elevation of the conveyer, in which the maximum variation in said elevation is possible with a minimum movement of a crank.

A further object of this invention is to provide a material handling machine having an improved underslung truck which provides ample space for mounting the power unit so that the same will not interfere with the raising and lowering of the conveyer.

It is a further object of this invention to provide a material handling machine in which the truck wheels may be swiveled to various angles with respect to the frame, and in which the truck is capable of absorbing the added strain thereon when said wheels are changed in position.

It is a further object of this invention to provide a material handling machine which is efficient in operation, and in which the truck portion, due to its novel construction, has a maximum carrying capacity.

With the above and other objects in view, the invention consists of the improved material handling machine with all its parts and combinations as set forth in the claims and all equivalents thereof.

In the accompanying drawings, in which the same reference characters designate the same parts in all of the views:

Fig. 1 is a side elevation of the device showing the conveyer in a partially raised position and showing the wheels of the truck in a position at right angles to the conveyer;

Fig. 2 is a similar view showing the conveyer in a lowered position and showing the wheels of the truck in their normal position;

Fig. 3 is an enlarged detail view of a portion of the device showing the improved means on the truck for effecting the raising and lowering of the conveyer;

Fig. 4 is an enlarged transverse sectional view; and

Fig. 5 is an enlarged sectional view taken on line 5—5 of Fig. 3.

Referring to the drawings, the numeral 8 designates a conveyer frame over which an endless belt is movable. The said belt is driven by means of a sprocket wheel 9 mounted on a shaft 10. Extending through an intermediate portion of the conveyer frame is a shaft 11 carrying a sprocket wheel 12 on one end and a sprocket wheel 13 on its other end. The sprocket wheel 12 is connected with the sprocket 9 by an endless chain 14. Journaled in bearings on the lower side of a housing 15 upon the conveyer is a shaft 16. The said shaft carries a sprocket wheel 17 on one end and a gear 18 on its other end. The sprocket wheel 17 is connected with the sprocket 13 by an endless chain 19. The gear 18 meshes with a gear 18' on the drive shaft of a motor 20, the said motor, through the above described sprockets and endless chain, transmitting movement to the endless conveyer belt. Projecting downwardly from each side of the conveyer frame are brackets 21, to each of which one end of an angle member 22 is connected. The other ends of the angle members 22 are rigidly connected to the lower portions of arcuate angle members 23, the upper ends of said members being secured to the sides of the conveyer frame.

A shaft 24 is journaled in the plates 21, and carries rigidly at each end a ratchet-wheel 25. The said ratchet-wheels 25 are engaged by dogs 26. A crank handle 27 is secured to one end of the shaft 24 to rotate the same.

The shaft 24, adjacent the ratchet-wheel at each end, is provided with a drum 28.

Pivotally mounted on each end of the shaft 24 are truck side pieces 29. The said truck side pieces carry at their outer ends upwardly extending arcuate members 30, which are angular in cross-section. The said members face in the opposite direction from the members 23, and are adapted to slide therealong, there being a space between the sides of the members 23 and 30. The outer ends of the members 29 are connected by a transverse portion 31 which projects outwardly at each end beyond the members 29. Mounted on these projecting portions of the member 31 and on the members 29 are plates 32. Said plates are provided with a plurality of perforations 33.

Wheels 34 are rotatably mounted upon short axles 35, the said axles being provided with perforations near the hub of the wheel and near the end portion of the axle. Bolts 36 are used to secure the short axles 35 to the plates 32, at any one of various angles, by using different perforations for the bolts, by which the angle at which the wheels are positioned may be varied.

On the upper end of each of the members 30 is a block 37 for pulleys 38. At the lower end of each of the arcuate members 23 is a block 39 for pulleys 40. A cable 41, which has one end windable on the drum 28, passes around one of the pulleys 40, over one of the pulleys 38, around the other of the pulleys 40, over the other pulley 38, and has its other end secured to the block 39.

The operation of the device is as follows:
Assuming that the truck is in the position shown in Fig. 2, the crank handle 27 is turned to rotate the drums 28. This causes the cables 41 to be wound upon said drums, and as a result, the pulley blocks 37 and 39 are drawn toward one another, thus causing the arcuate members 23 to slide upwardly within the members 30, and thus raising the conveyer frame to the position shown in Figs. 1 and 3. The conveyer may be locked at any desired point by means of the dog 26 engaging the teeth of the ratchet 25 to prevent retrograde movement of the drum. By means of the pulley arrangement a great leverage may be obtained, as a maximum movement of the conveyer results from a change of only one niche in the ratchet 25.

If it is desired to swing the wheels from the position shown in full lines in Fig. 5 to the position shown in the dotted lines, it is merely necessary to move the outer bolt 36 and to swing the short axle around to the position shown by the dotted lines, where the bolt may be replaced in the perforation provided therefor. By use of the other perforations 33 various other angles of the wheels may be obtained as desired. With the wheels in the position shown in Fig. 1, the conveyer may be moved in a circle.

With the use of this improved form of truck, in addition to providing a novel form of raising mechanism it provides a space for the power unit, the said unit not interfering in any manner with the raising operation. Fig. 2 shows the position of the power unit when the conveyer is in a fully lowered position, the said unit fitting freely between the frame members 29.

From the foregoing description it may be seen that a material handling machine has been provided which is supported by a very simple but substantial form of truck, the said truck, in addition to the above-mentioned desirable features, embodying a novel means for raising and lowering the conveyer frame.

What I claim is:

1. A material handling machine comprising a conveyer, side members extending at an angle from and below said conveyer, arcuate members connecting the outer ends of said side members with the conveyer, a supporting truck to which the conveyer is pivoted, said truck consisting of side members pivoted at one end to opposite sides of the conveyer, a transverse member connecting the other ends of said truck side members, and arcuate members extending upwardly from said ends of the side members and slidably engaging the arcuate members connected with the conveyer, and means for causing slidable movement of the arcuate members with respect to one another to cause pivotal movement of the conveyer on the supporting truck.

2. A material handling machine comprising a supporting portion, a conveyer pivotally connected thereto, a curved arm extending downwardly from said conveyer, a curved arm extending upwardly from said supporting portion, both of said curved arms being L-shaped in cross section and fitting adjacent one another to form a channel, and means extending within said channel for causing said curved arms to slide with respect to one another to cause the conveyer to pivot on said supporting portion.

In testimony whereof, I affix my signature.

CHARLES H. BEBINGER.